United States Patent [19]

Hamer

[11] 4,170,009
[45] Oct. 2, 1979

[54] MULTIPLE CHANNEL ELECTRONIC COUNTERMEASURES RECEIVER SYSTEM
[75] Inventor: Edward G. Hamer, North Linthicum, Md.
[73] Assignee: The United States of America as represented by the Secretary of the Air Force, Washington, D.C.
[21] Appl. No.: 327,848
[22] Filed: Dec. 3, 1963
[51] Int. Cl.$^2$ ............................. G01S 7/36; H04B 1/10
[52] U.S. Cl. ................................. 343/18 E; 325/474; 325/477
[58] Field of Search .................. 343/18, 100.7, 100.12, 343/18 E; 325/473, 474, 476, 477, 478, 482

[56] References Cited
U.S. PATENT DOCUMENTS
3,706,933  12/1972  Bidell et al. ...................... 325/474 X Primary Examiner—Malcolm F. Hubler
Attorney, Agent, or Firm—Joseph E. Rusz; Eugene J. Pawlikowski

EXEMPLARY CLAIM

1. A multiple channel electronic countermeasures radar receiving system comprising:
an input to which periodic echo pulses beat to the intermediate frequency of the system and combined with random noise energy is applied;
limiting receiver means including in the order recited a limiter amplifier coupled to said input and having a pass band centered on the intermediate frequency, a narrow band-pass filter fed by the amplifier and having a center frequency the same as the intermediate frequency, and a balanced detector fed by the filter for converting phase changes of the intermediate frequency echo pulses to video amplitude changes;
a nonlimiting receiver coupled to said input and having limiting characteristics linear for small signals and logarithmic for large signals,
gate signal-generating means tuned to a frequency within the pass band of the amplifier but removed from the intermediate frequency for receiving output signals of the amplifier, said gate signal-generating means producing a gate control signal in response to random noise energy defined by a relatively wide band of frequencies bracketing the pass band of the amplifier and attenuating output signals of the amplifier which have a relatively narrow band of frequencies confined to the neighborhood of the intermediate frequency,
a video utilization means,
and gate means controlled by said gate signal-generating means for, at times when the gate control signal is derived, gating the output of the balanced detector only to the video utilization means and at other times coupling only the output of the nonlimiting receiver to the video utilization means.

2 Claims, 8 Drawing Figures

MULTIPLE CHANNEL ELECTRONIC COUNTERMEASURES RECEIVER SYSTEM

This invention relates to electronic countermeasures systems and, particularly, to multiple channel anti-jam radar receivers that distinguish automatically between the noise characteristics of different jamming signals.

Search radar systems generally include anti-jammer circuits in order to insure a satisfactory presentation of returning echoes on the oscilloscope screen when the echoes are presented to the receiver concurrently with jamming signals of the same or nearly the same wavelength. Obtaining an effective video display and a useful demarcation between echo pulses and jamming signals is made all the more difficult in view of the different forms of jamming signals available. In order to prevent extreme insensitivity of the receiver to echo returns, radar systems normally employ an operator stationed at an anti-jam console whose responsibility is to analyze and identify the specialized jamming signals and then, judging from the anti-ECM performance of the system, to select from several alternate receivers one receiver considered to be best adapted to combat the jamming used. The optimum receiver in most cases is simply coupled to the receiver link by manual selections made at a console. Manual selection of this nature is adequate until a complex jamming environment presenting many types of jamming is encountered.

It is instructive for the moment to consider the more common forms of random noise distribution likely to be encountered by radar receivers, either due to enemy jamming or natural interference. All signals resembling random noise have a degrading effect on the receiver in that they blanket a large part of the frequency spectrum of the receiver pass band. It is sufficient for the purposes of this specification to state that jamming signals of the noise variety can be grouped separately into two categories; i.e., wide-band noise and narrow-band noise. Some forms of jamming commonly classed as wideband noise include pulse repeater jamming, pulse jamming, and sweep jamming. As one example, wide-band noise may be generated by chopping a narrow-band width sample of noise so that each harmonic of the chopping signal, when mixed with the noise sample, produces many overlapping noise samples that extend over a wide portion of the frequency spectrum. Radiated noise of the narrow-band type has power spread over a much narrower part of the spectrum, thus giving little or no concentration of noise power at the upper and lower limits of the receiver pass band. Narrow band noise, therefore, as will be understood in the discussion hereinbelow, refers to noise having a band width approximately equal to the information bandwidth of the receiver. Continuous wave, weather clutter and chaff jamming are characterized as narrow-band noise.

Accordingly, one object of the invention is to provide an automatic receiver selector for use in jamming environments.

Another object of the invention is the provision, in a radar system, of an automatically responsive receiver selector which lessens the vulnerability of the system to enemy countermeasures interference.

A futher object of the invention is to provide a radar receiving system which automatically responds to the dominant form of noise interference to select the receiver best adapted to minimize the effects of the noise.

Still a further object of the invention is the provision of an anti-jam receiver which is helpful to the anti-jam operator in the performance of certain tasks.

A complete understanding of the other objects, features, and advantages of the invention not specifically mentioned may be had from the following description of one embodiment thereof when taken in conjunction with the appended drawings, wherein.

Figure 1:
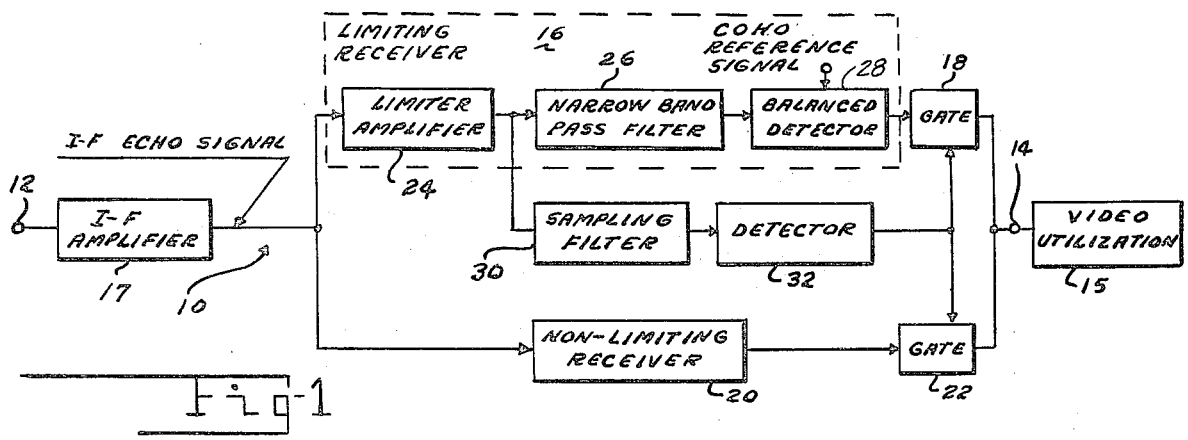
FIG. 1 shows a functional block diagram of the multiple anti-jam receiver of the invention.
Figure 3A:
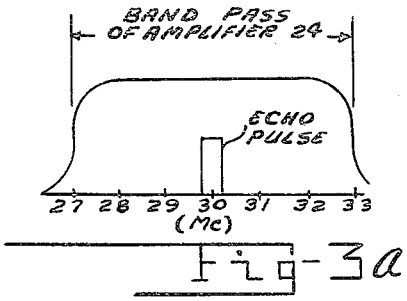
Figure 4A:
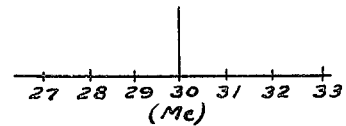
Figure 3B:
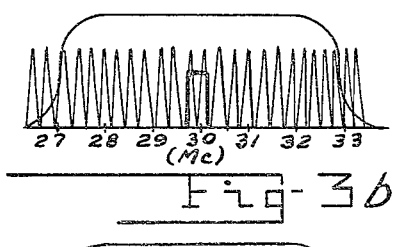
Figure 4B:
Figure 3C:
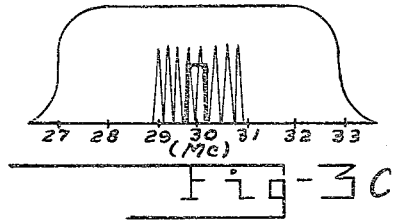
Figure 4C:
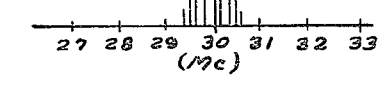

FIGS. 3a, 3b and 3c show approximations of combined signal and noise waveforms as they would appear in the circuit of FIG. 1; and, FIGS. 4a, 4b and 4c are spectral equivalents of the waveforms of FIGS. 3a, 3b and 3c, respectively.

Referring to FIG. 1, a multiple radar receiver generally referenced 10 includes an input terminal 12 coupled to that part of the radar system having applied to it periodic echo signals at intermediate frequency rather than radio frequency, and an output terminal 14 to which may be connected a suitable video utilization means 15, such as a video amplifier strip, cathode ray tube display, or the like. One or more stages of i-f amplification are represented in FIG. 1 by i-f amplifier 17. When the radar receiver 10 is not being exposed to jamming signals, it will be understood that the i-f echo returns may, instead, be gated not to input terminal 12 but to one of several other radar receivers, such as conventional MTI coherent and non-coherent receivers, which offer certain operational advantages in jam-free environments. When jamming is encountered, i-f echo returns will be manually directed to input terminal 12, by suitable apparatus not shown.

The output signals of amplifier 17 are directed over two parallel paths only one of which is placed into operation at any given time. The first or upper path, as shown in FIG. 1, has the general organization of a limiting receiver 16 in series with a gate 18, whereupon proper excitation of gate 18 receiver 16 has its output signals gated to output terminal 14 and, thence, to video utilization means 15. The second or lower path includes a nonlimiting receiver 20 coupled in series with a gate 22 and output terminal 14. By suitably exciting gate 22, the arrangement is one that will couple the output of the nonlimiting receiver to video utilization means 15. The operation of gate circuits is well known; any suitable gate circuit could be employed with satisfactory results.

Limiting receiver 16 includes a limiter amplifier 24 fed by the i-f signals from amplifier 17 and provided with a pass band centered substantially on the intermediate frequency. An intermediate frequency of 30 Mc would be appropriate to a system of the type embodying the invention since 30 Mc is an intermediate frequency in common use with many radar sets. For purposes of illustration, it will be assumed that limiter amplifier 24 has a fixed band width of roughly 6 Mc. With this requirement, the pass band of amplifier 24 occupies that part of the spectrum between 27 Mc and 33 Mc. No particular significance is attached to the specific value chosen for the intermediate frequency since, of course, it will be understood by those skilled in the art that a higher or lower frequency might well be chosen depending on multiple considerations. Too, band widths of other than 6 Mc are possible depending, as one example, on the noise figure and selectivity characteristics desired. The effect of band width variations in amplifier 24 will be discussed hereinbelow.

Limiter amplifier 24 feeds into a narrow pass band filter 26 centered substantially on the intermediate frequency and adjusted to have a pass band considerably narrower than the pass band of amplifier 24. The narrow pass band of the filter 26 compensates for the liberal pass band of amplifier 24 and thus adds further to the loss of possible jammer energy which falls outside the neighborhood of the intermediate frequency. Filter 26 feeds into a balanced detector 28 of a type well known in the art as having a second input, herein termed the coho reference signal, in the manner of moving target indicating systems (MTI), whereby the balanced detector 28 converts phase changes of the i-f echo pulses at the input to video amplitude changes at the output suitable for video amplification and subsequent utilization and display. The operation of the balanced detector represented in FIG. 1 is treated in full detail in Volume 1 of the Radiation Laboratory Series, pages 665 and 666.

Figure 2:
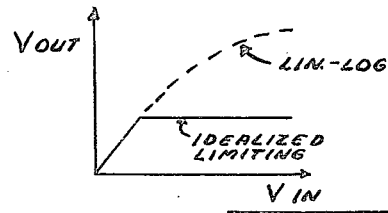
FIG. 2 shows a comparison of the response characteristics of limiting and nonlimiting receivers.

For situations of unusually heavy concentrations of weather clutter, chaff, or the like, and during jamming by hostile transmitters, it is well known in the radar art that certain types of receivers are better suited than others for coping with a select type of noise. Two types of receivers very useful for maintaining the greatest possible sensitivity for moving targets in the face of severe noise environments are the nonlimiting and limiting receivers. Equally suitable as nonlimiting receivers are the automatic system noise leveling receiver (ASNL), the back-bias receiver (IAGC) and, the lin-log receiver. For ease in describing the operation of the illustrated embodiment of the invention, the nonlimiting receiver 20 shown herein will be assumed to take the form of a lin-log receiver. Specifically therefore, the lin-log (nonlimiting) receiver 20 has limiting characteristics linear for small signals and logarithmic for large signals and greatly increases the ability of the radar to track targets through weather clutter. In the case of the limiting receiver, it is most suitable for sharply maintaining a maximum level for input signals of large amplitude without overloading and is extremely useful in combating signals resembling wide-band noise. The limiting receiver thus removes amplitude variations above a certain level and is to be preferred for general MTI jamming use. However, since the limiting receiver cannot detect amplitude changes above the flat part of its response curve, where moving targets are to be detected in the clutter by the fluctuations which they create in the clutter amplitude, it is advantageous to use a nonlimiting receiver for the reason that there is less likelihood of suppressing to a nonuseable level the fluctuations of desired echo returns. FIG. 2 illustrates wave shapes peculiar to limiting receivers and nonlimiting receivers which give a logarithmic expression of large signals. The curve shown in FIG. 2 for the limiting receiver represents idealized limiting.

Turning now to amplifier 24 in the limiting receiver, a sampling filter 30 tuned to a frequency removed from the intermediate frequency but still within the pass band of limiter amplifier 24 receives the output of amplifier 24. Filter 30 has the characteristics of passing output signals from amplifier 24 which have random noise energy defined by a relatively wide band of frequencies embracing the pass band of amplifier 24. Let it be assumed, for illustrative purposes, that filter 30 has a center frequency of around 27 Mc, i.e., near the lower edge of the pass band of amplifier 24 (FIG. 3a). FIG. 3b shows waveforms which approximate the output of amplifier 24 of FIG. 2 when receiving an echo pulse combined with wide-band noise. As can be seen, the wide-band noise will fill the pass band of amplifier 24 thus causing a 27 Mc carrier signal output from sampling filter 30. Coupled to the output of sampling filter 30 is a detector 32 of multivibrator form or the like for deriving a gate control signal at times when filter 30 delivers an output signal. The gate control signal of detector 32 places gate 18 in the "on" state and gate 22 in the "off" state so as to complete the circuit between the input and output terminals 12 and 14, respectively, through limiting receiver 16. Simultaneously, gate 22, by being "off," opens or interrupts the lower alternate path with the result that only limiting receiver 16 is placed into operation.

Since filter 30 has a center frequency off-set from the intermediate frequency, it follows that filter 30 will reduce substantially to zero all those signals which, while within the pass band of amplifier 24, have a relatively narrow band of frequencies in the neighborhood of the intermediate frequency. FIG. 3c is an approximation of narrow-band noise centered about the intermediate frequency and, combined with an echo pulse, fed by amplifier 24 to the input of filter 30. Thus, in the event that jamming or noise interference appears in the form of the narrow-band noise represented in FIG. 3c, the signal sampled by filter 30 will fall to zero or thereabouts. When this occurs, the aforementioned gate control signal of detector 32 is no longer available and the output of detector 32 becomes such that gate 18 is switched "off" and gate 22 "on." Upon this reversible operation of gates 18 and 22, the output of nonlimiting receiver 20 only is supplied to output terminal 14.

Spectral equivalents of the waveforms of FIGS. 3a, 3b and 3c are shown in FIGS. 4a, 4b and 4c, respectively.

If the character of the noise information alternates between the wide-band and narrow-band types, the overall receiver 10 will respond automatically to the dominant form and place into operation the one of the limiting and nonlimiting receivers considered the best adapted to cope most successfully with the selective jamming. Thus, the automatic receiver selector of the invention justifies itself particularly in the presence of multiple jamming from widely scattered aerial jammers using one or the other of the jamming modes at the same time. The automatic receiver selector will do what the anti-jam operator may not be capable of doing, i.e., provide for fixes by sector as required in a continually changing air situation. The task of the anti-jam operator may then be reduced under these operational conditions to the essential task of directing retaliatory measures according to the situation presented on his console indicators.

In the foregoing description of the automatic receiver selector of the invention, it was mentioned that variations of the band width of limiter amplifier 24 are readily possible without imparing the selectivity response of the system. For example, it is conceivable that signal-to-noise or other considerations may require compression of the pass band of amplifier 24 from 6 Mc to say 4 Mc. Assuming then a narrower pass band of amplifier 24, it will be recognized that there remains only to adjust the center frequency of sampling filter 30 to a new value bordering one of the new pass band limits of amplifier 24, that is, shift the center of frequency of filter 30 to a point adjacent the upper or lower limit but still within the pass band of, limiter amplifier 24, and comfortably outside that part of the spectrum which is expected to fill with narrow-band noise.

It will be evident from the illustrative embodiment which has been set forth that various changes and modifications may be made by those skilled in the art without departing from the spirit of the invention or the scope of the appended claims.

I claim:

1. A multiple channel electronic countermeasures radar receiving system comprising:
   an input to which periodic echo pulses beat to the intermediate frequency of the system and combined with random noise energy is applied;
   limiting receiver means including in the order recited a limiter amplifier coupled to said input and having a pass band centered on the intermediate frequency, a narrow band-pass filter fed by the amplifier and having a center frequency the same as the intermediate frequency, and a balanced detector fed by the filter for converting phase changes of the intermediate frequency echo pulses to video amplitude changes;
   a nonlimiting receiver coupled to said input and having limiting characteristics linear for small signals and logarithmic for large signals,
   gate signal-generating means tuned to a frequency within the pass band of the amplifier but removed from the intermediate frequency for receiving output signals of the amplifier, said gate signal-generating means producing a gate control signal in response to random noise energy defined by a relatively wide band of frequencies bracketing the pass band of the amplifier and attenuating output signals of the amplifier which have a relatively narrow band of frequencies confined to the neighborhood of the intermediate frequency,
   a video utilization means,
   and gate means controlled by said gate signal-generating means for, at times when the gate control signal is derived, gating the output of the balanced detector only to the video utilization means and at other times coupling only the output of the nonlimiting receiver to the video utilization means.

2. A multiple channel radar receiving system for use in jamming environments comprising: input means to supply periodic echo pulses reduced to the intermediate frequency and combined with jamming signals,
   limiting receiver means including in the order recited a limiter amplifier coupled to the input means and having a pass band centered on said intermediate frequency, a narrow band-pass filter fed by the amplifier and resonant substantially at the intermediate frequency, said fitler having a narrower band width than said amplifier, and a balanced detector for converting phase changes in the echo returns from the filter to video amplitude changes;
   a nonlimiting receiver coupled to the input means and having limiting characteristics linear for small input signals and logarithmic for large input signals,
   gate signal-generating means including a filter means having a resonant frequency established adjacent one of the limits of the pass band of the amplifier for receiving output signals of the amplifier, said gate signal-generating means producing a gate control signal in response to random noise energy covering a relatively wide band of frequencies overlapping the amplifier pass band and attenuating signals which are outside a relatively narrow band of frequencies in the neighborhood of the intermediate frequency,
   video signal utilization means,
   and gate means controlled by the gate signal-generating means for, at times when the gate control signal is derived, gating only the output of the balanced detector to the utilization means and, at other times, coupling only the output of the nonlimiting receiver to the utilization means thereby automatically distinguishing between random noise signals having wide-band and narrow-band characteristics, respectively.

* * * * *